United States Patent
Barth

[11] B 3,924,419
[45] Dec. 9, 1975

[54] FLEXIBLE JAW CLUTCH COUPLING

[76] Inventor: Harald H. Barth, Hermannstrasse 103, 663 Neunkirchen, Saar, Germany

[22] Filed: Apr. 11, 1973

[21] Appl. No.: 350,143

[44] Published under the Trial Voluntary Protest Program on January 28, 1975 as document no. B 350,143.

[30] Foreign Application Priority Data
June 12, 1972 Luxembourg............... 65497

[52] U.S. Cl.............. 64/14; 64/9 A; 64/27 NM
[51] Int. Cl.² ........................................ F16D 3/64
[58] Field of Search............. 64/14 R, 9 R, 9 A, 16, 64/27 NM

[56] References Cited
UNITED STATES PATENTS

| | | | |
|---|---|---|---|
| 2,105,702 | 1/1938 | Scholtze | 64/14 |
| 2,620,640 | 12/1952 | Bales | 64/14 |
| 2,716,334 | 8/1955 | Scott et al. | 64/14 |
| 2,891,395 | 6/1959 | Chater | 64/14 |
| 2,943,464 | 7/1960 | Voges | 64/14 |
| 3,485,062 | 12/1969 | Blake | 64/14 |

*Primary Examiner*—Samuel Scott
*Assistant Examiner*—Randall Heald

[57] ABSTRACT

A flexible jaw clutch coupling is presented composed of two coupling halves, each of which has a cylindrical outer housing or casing, a cylindrical attachment, and a plurality of axially parallel claws with concave flanks evenly spaced apart around the periphery of the coupling half. The claws overlap axially but are spaced apart circumferentially, and the space between opposed opposite concave flanks contains a shaped part of elastic material. The elastic material is in the form of a single annular molded part made up of the shaped parts which interdigitate with the claws and intermediate end or bridge pieces alternately interconnecting opposite end faces of adjacent molded parts.

11 Claims, 5 Drawing Figures

FLEXIBLE JAW CLUTCH COUPLING

BACKGROUND OF THE INVENTION

1. Field of the Invention

This invention relates to the field of flexible jaw couplings. More particularly, this invention relates to flexible jaw couplings of the type having a molded or otherwise shaped elastic part interfacing the connection between the two halves of the jaw coupling.

2. Description of the Prior Art

Flexible jaw clutch couplings having intermediate elastic parts have been known in the art, but such prior art devices have encountered a number of problems. In known couplings of this type, the molded part is exposed on the outermost side, as viewed in the radial direction, or it is protected by an additional annular ring or collar detachably connected to at least one of the coupling halves. In arrangements of this type the molded part is exposed to either the danger of mechanical damage by contact from foreign objects or to the danger of chemical decomposition if the coupling is used in an environment, such as refrigerator apparatus, where it may be exposed to chemicals. Resort has been had to the inclusion of the additional component of a protective ring to prevent exposure to such mechanical damage or chemical decomposition. However, the use of a protective ring increases the cost of the coupling and makes the task of assembling and installing it more difficult. Furthermore, a protective ring renders the coupling halves less flexible in respect of one another, especially in situations where they have to be placed at an angle or offset in relation to one another. Couplings have also been known in the prior art in which the shaped elastic parts, particularly when the coupling halves are axially offset to any considerable extent or are positioned at an angle, do not have adequate support in the radially inward direction, and this lack of adequate support leads to tilting and finally rapid destruction of the parts.

Other prior art couplings are known in which the shaped elastic parts, particularly during start-up operations involving the transmission of high torques, or when the two couplings halves are positioned at a considerable angle with respect to each other, are unable to accommodate the necessary flexing and expansion which is required radially inwardly as well as radially outwardly.

The present invention avoids these and other drawbacks of the prior art devices and provides a low cost coupling which is sufficiently robust to operate under exacting conditions in a trouble-free manner and is capable of flexing or expanding longitudinally, transversely, angularly and rotationally.

SUMMARY OF THE INVENTION

In the present invention the cylindrical outer housings or casings of the coupling halves are spaced apart and do not contact each other when the coupling is assembled, and the central cylindrical attachment of each coupling half does not extend toward the other coupling half any further than the end of the outer cylindrical casing. Also, the radial distance between the cylindrical attachment of each coupling half and the outer casing is greater than the radial dimensions of the claws which extend beyond the outer housing into the other coupling half, and the end flanks of the claws have surfaces which extend radially inwards and radially outwards to join with the cylindrical extension and the outer casing, respectively, to form, in conjunction with the claw flanks, common concave surfaces.

On each coupling half the spacing between adjacent claws is greater than the width of a claw. The spacing is actually of sufficient size to accommodate both the interlocking claw from the other half of the coupling as well as two flexible coupling pieces. The flexible pieces are shaped pieces of molded elastic material having convex side pieces complimenting the concave flanks of the claws and having bridging pieces alternately connecting, at opposite ends, adjacent shaped parts. These shaped parts and bridging end pieces are formed in a unitary annular piece which is positioned between the coupling halves in the assembled state of the coupling whereby the shaped piece is positioned between each successive claw (each successive claw being from a different coupling half) in the assembled state.

Due to the fact that the cylindrical outer casings of the two coupling halves are spaced apart, axial displacements and angular flexing or movement of the two coupling halves with respect to each other can be accommodated up to a limit determined by the separation distance. The increased space, both radially inward and radially outward, at the flanks of the claws, and the spacing between the flanks of the claws in which the molded pieces are positioned, insures that when particularly high torques are being transmitted, such as on start-up, the shaped parts will be able to expand in the radial direction, both inwardly and outwardly. Also, the shaped parts are able to roll over the increased flank surfaces when the coupling halves are axially offset or positioned at an angle with respect to one another. The usually encountered internal deformation work and the resultant thermal stress, which in the long run usually causes destruction of the molded elastic parts is largely eliminated by the configuration of the present invention.

Although the two halves of the jaw coupling can be indentical, other advantages can be realized in the present invention by modifying the configuration of one or more of the jaw halves.

In one modification one of the coupling halves has a detachable rim of claws which are axially movable. This permits easy inspection of the shaped annular elastic ring without having to detach the driving or take-off unit from the rest of the system. Also, the axial extension of the cylindrical attachment is limited to not more than one-fifth of the longitudinal length of the shaped parts, and this permits the ring of shaped parts to be removed from a coupling assembly just by loosening the rim of claws and removing the flexible ring, without having to take the coupling apart.

In another embodiment, the coupling halves are composed of intermediate rings having the jaw configuration at one end and the other end of which is detachably connected to a flange on the hubs of the drive and take-off shafts. Disassembly of the entire coupling, either for inspection or replacement, is accomplished simply by disengaging the intermediate rings from the flanges and moving the coupling radially outward.

In still another embodiment the intermediate ring is divided into several parts, each of which may be directly connected, or which may be connected by interengaging jaws in accordance with the present invention. The configuration, wherein one or more of the intermediate rings is divided into a series of discs permits accommodation of the coupling to a wide range of situations. For example, the coupling can easily be adjusted to accommodate whatever gap may exist between the driving member and the take-off member and allows the torque curve to be adapted to the given requirements of a situation. Also, this embodiment makes it possible to connect together and transmit the torque between a driving unit and a driven unit which are set at a considerable angle with respect to each other without the risk of rapid destruction of the shaped elastic part as a result of the accumulation of heat since the angle and torque transmission can be accommodated at several stages through the coupling when each of the discs of the intermediate ring is itself fitted with interengaging jaws and molded elastic intermediate pieces.

In the several embodiments of the invention, the components of the coupling halves are interchangeable, and this interchangeability of the individual parts, on the principal of the assembly of prefabricated units, enables the components to be manufactured and stored at moderate cost and insures that the apparatus will be widely adaptable not only to existing local conditions but also to any technical transmission values required. This interchangeability further enhances the advantage of being able to withdraw the ring or rings of shaped parts to be inspected and, if necessary, to be replaced, without having to detach the driving or take-off unit from whatever device to which it is secured.

The above discussed features and advantages of the present invention, and others, will be apparent to and understood by those skilled in the art from the following detailed description and drawings.

BRIEF DESCRIPTION OF THE DRAWING

In the drawings, wherein like elements are numbered alike in the several figures.

DESCRIPTION OF THE PREFERRED EMBODIMENTS

Figure 1:
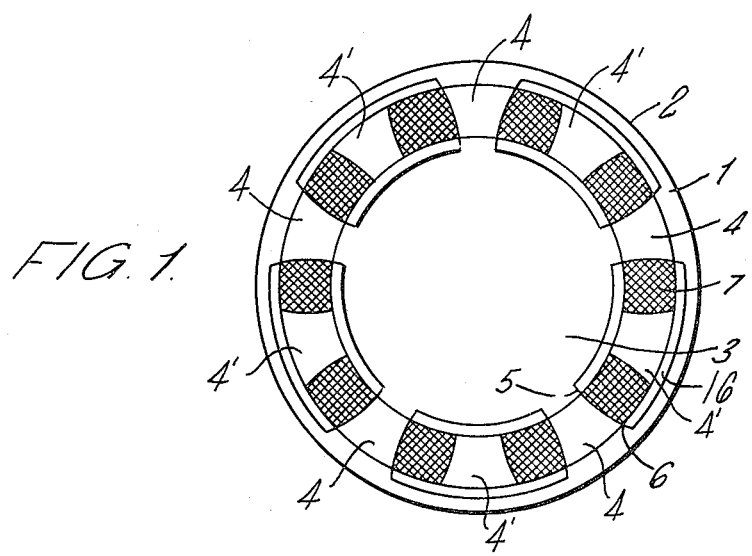
FIG. 1 is a plan view of one coupling half as viewed from another.
Figure 3:
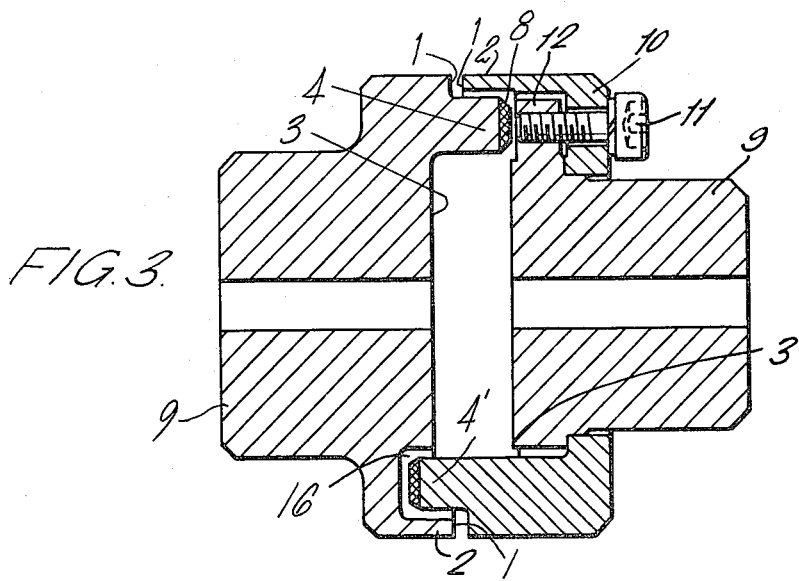
FIG. 3 is a cross-sectional view of a coupling half with a detachable rim of claws affixed to the hub of one of the coupling halves.

Referring now to FIG. 1, a coupling half is shown such as would be seen by looking at the left hand coupling half viewed from the position of the right hand coupling half of FIG. 3. The coupling half consists of an outer housing or casing 2 with an outer annular end face 1, a central cylindrical attachment 3 for connection to a driving or driven unit, and claws 4 which extend beyond the outer casing into the other coupling half. The claws 4 have concave side surfaces, and the claws are equally spaced apart about the coupling half. Concave shaped wall surfaces 5 and 6 extend radially inwardly and outwardly, respectively, from the concave flanks of the claws at the roots of the claws to form an enlarged pocket 16 between each pair of adjacent claws 4 of each coupling half. It will be noted that the radial dimension of the pocket 16 is greater than the radial dimension of a claw.

As seen in FIG. 1, claws, marked 4', from the other coupling half extend into pocket 16 approximately half way between the claws 4. Longitudinal segments 7 of a molded elastic ring occupy the remaining spaces between each claw 4 and claw 4' from the other coupling half. The elastic parts 7 have convex outer side surfaces to conform to the concave side flanks of the claws 4 and 4'.

Figure 2:
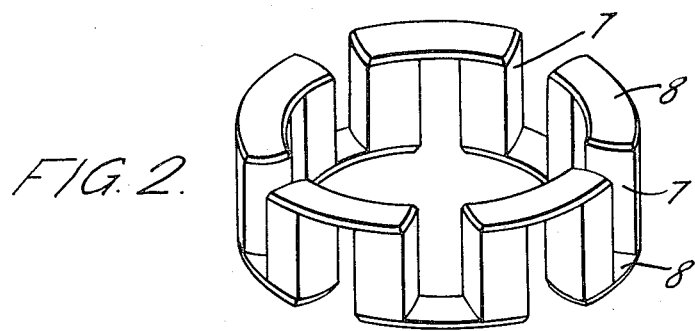
FIG. 2 is a perspective view of a unitary ring of shaped elastic parts.

The ring of molded elastomer is shown in FIG. 2 wherein it can be seen that each two adjacent shaped parts 7 is joined by a bridging piece 8 at one set of end faces, the bridging pieces 8 being alternately located at opposite end faces.

In assembling the flexible coupling of the present invention, the elastomer ring shown in FIG. 2 is placed between the coupling halves so that in the assembled coupling the shaped parts 7 are interdigitated between successive claws 4 and 4' of the jaw halves with the bridges 8 extending over the ends of the claws, as shown in FIG. 3.

Referring now to FIG. 3, a modified version is shown wherein the coupling half on the right side has a detachable rim of claws 10 detachably connected to a flange 12 on the hub 9 by means of suitable securing means 11. The hub 9 is attached to either the driving or driven member, and the corresponding hub of the other half of the coupling is connected to the other of those members. The rim of claws 10 can, after detaching the securing means 11, be pushed to the right in the axial direction so as to expose the enclosed annular ring of shaped parts for inspection. As will be apparent, this removal of rim 10 can be accomplished very quickly without having to detach either the driving or take-off units and without having to separate the coupling halves.

As a further feature of the configuration shown in FIG. 3, the axial extension of the cylindrical attachment 3 of the right hand coupling half extends toward the other coupling half not more than one-fifth of the length of the shaped parts 7. This permits an easy assembly of the two coupling halves as the driving and driven units can first be aligned with the two coupling halves, but without the ring of shaped parts in place, and then secured in position. Then the retaining means 11 can be removed and rim 10 slid to the right over the hub 9 and the unitary elastomer ring can then be inserted into the coupling in a radial direction from outside as a single annular component, with the rim 10 then being slid back into place and retained by securing means 11. Similarly, the annular ring of elastomer material can be removed and replaced in the same manner without having to release the driving or take-off units from whatever device to which they are secured.

Regardless of whether the coupling halves are identical, as discussed with respect to FIG. 1, or have the rim of claws modification shown in FIG. 3, it will be seen that the annular elastomer ring is always substantially covered by the outer casing 2, thus protecting the elastomer ring from mechanical damage, such as by abrasion, or chemical damage, such as by the splashing of the corrosive materials. Furthermore, as shown in FIG. 3, it will be noted that the end faces 1 of the cylindrical outer casings of the two coupling halves are not in contact and that the cylindrical attachment of each half does not extend beyond the outer casing of that half. Furthermore, it will be noted, as mentioned with regard to FIG. 1, that the radial distance between the cylindrical attachment (from the radially inner surface of pocket 16) and the outer casing is greater than the radial dimension of the claws. In other words, the radial dimension of the pocket 16 is defined by the common concave surfaces formed by the flanks of the claws and the surfaces 5 and 6. Because of the separation between the outer casings of the two coupling halves, the coupling halves are able to undergo axial displacements and angular movements with respect to one another up to a limit corresponding to that separation between them. Furthermore, the fact that the radial dimension of the pockets 16 exceeds the radial dimension of the teeth, and the fact that the shaped parts 7 do not completely fill the spacing between teeth, insures that when particularly high torques are being transmitted, such as on start-up, the shaped parts will be able to expand in a radial direction and that when the coupling halves are axially offset or positioned at an angle in respect to one another the shaped parts will be able to roll over the increased flank surfaces.

Figure 4:
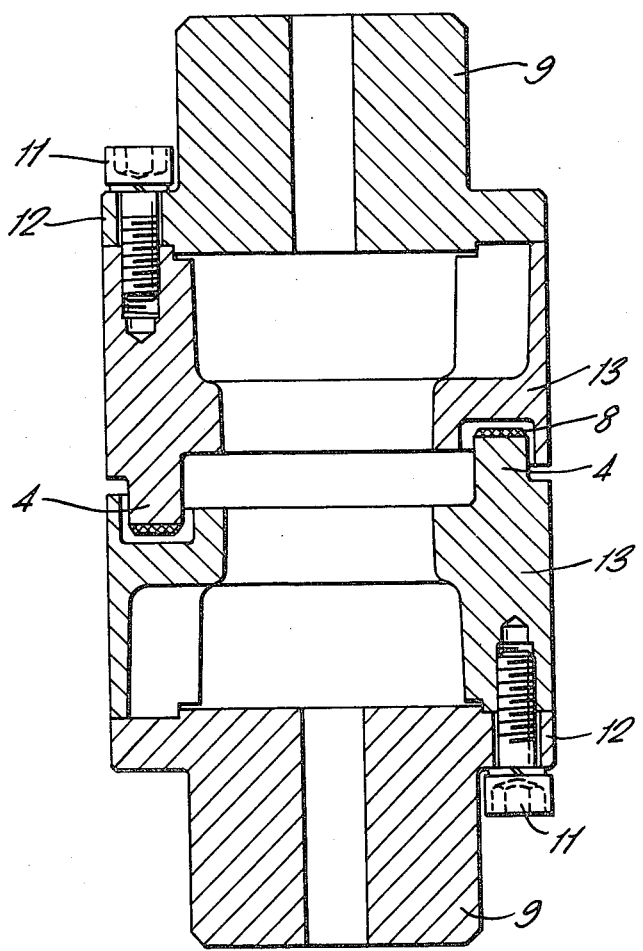
FIG. 4 is a cross-sectional view of a coupling with two identical intermediate rings.

Referring now to FIG. 4, a configuration is shown wherein each hub 9 is detachably connected, by securing means 11 and flange 12, to one end of an intermediate ring 13. Each of the intermediate rings 13 has, at its opposite face, the claw configuration discussed hereinabove for interlocking engagement. In this case the annular ring of shaped elastic parts is located between the opposed ends of the rings 13 on which the interlocking claws are located.

With the arrangement shown in FIG. 4, the intermediate rings 13 can, after release of the securing devices 11, be withdrawn together with the annular ring of shaped parts by moving the interlocked rings and shaped parts outwards in the radial direction in order to examine or replace the ring of elastic shaped parts. Thus, it can be seen that the annular ring of elastic shaped parts can be easily inspected and replaced, when necessary, merely by sliding out the two interlocked intermediate rings 13. Of course, reassembly is just as simple and is accomplished by putting the ring of shaped parts into position, interlocking the opposed claws of the intermediate rings 13 and then sliding the interlocked rings into position and securing with the securing devices 11. A particular advantage of the FIG. 4 configuration is that the intermediate rings 13 can be constructed identically, thereby minimizing production and storage costs and simplifying interchangeability.

Figure 5:
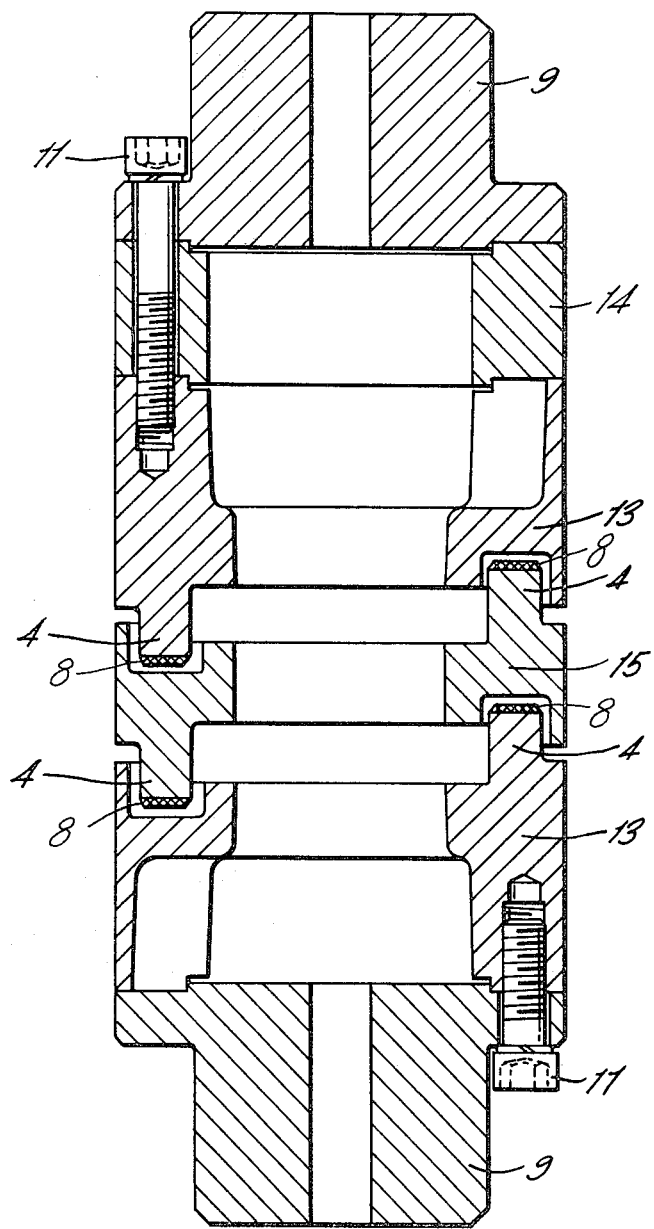
FIG. 5 is a view of a coupling with two elastic torque transmission units.

Referring now to FIG. 5, a particularly flexible coupling is shown in which two flexible coupling units are arranged in succession. The configuration shown in FIG. 5 includes a pair of intermediate rings 13 and a third intermediate ring 15. Intermediate ring 15 has claws 4 on both opposite faces. One coupling is formed by the engagement between upper ring 13 and one face of ring 15, the annular ring of molded elastic parts being positioned between the jaws, as described above. The second coupling is formed between the lower ring 13 and the other face of ring 15, and another annular ring of shaped elastic parts also being positioned between this pair of opposing jaws. As shown in the FIG. 5 configuration, another intermediate ring disc 14 serves to adapt the length of the coupling to the preexisting distance between the opposite hubs 9 of the driving unit and the driven unit. Thus, in the configuration shown in FIG. 5, it can be said that either one or both of the intermediate rings 13 can be subdivided into two or more discs extending over different but preselected distances in the longitudinal direction of the coupling.

If desired, all of the discs into which the intermediate rings of FIG. 5 are divided can be provided with interengaging claws which, together with properly positioned rings of elastomer parts, can form a series of flexible couplings. This arrangement enables a flexible coupling to be designed in such a way that units, each consisting of two discs with interengaging claws and the ring of shaped elastic parts, can be connected up in succession with one another. A configuration of this type not only offers the valuable advantage of enabling the torque curve to be adapted to the requirements arising in a particular situation, but also makes it possible, even when the driving and driven units are set at a considerable angle with respect to each other, to transmit the torque without risk of rapid destruction of the shaped elastic parts as a result of the accumulation of heat. A further advantage of this configuration resides in the fact that the method of construction of FIG. 5 with a series of flexible couplings allows for the components to be adopted optionally and permits a wide range of interchangeability.

While preferred embodiments have been shown and described, various modifications and substitutions may be made thereto without departing from the spirit and scope of the present invention. Accordingly, the invention has been described by way of illustration and not limitation.

What is claimed is:

1. A flexible coupling including:
   a pair of opposed interengaged coupling halves, each of said pair of opposed coupling halves having:
   a. a cylindrical outer housing having an end face;
   b. a cylindrical attachment within said outer housing; and
   c. a plurality of claws evenly distributed over the circumference of the coupling half and extending beyond the cylindrical housing of the coupling half into the other coupling half;
   the end faces of said cylindrical housings being spaced apart in the assembled state of said coupling;
   the cylindrical attachment of each coupling half extending toward the other coupling half for an axial distance less than the cylindrical housing of the coupling half;
   the flanks of each claw being concave and joining concave radially inwardly and outwardly extending surfaces at the roots of the claw to define a pocket between adjacent teeth in a coupling half to receive teeth from the other coupling half, the pocket having radial extending end portions defined by said radially inwardly and outwardly extending surfaces;
   the radial dimension of the pockets between the cylindrical attachment and the outer housing in each coupling half being greater than the radial dimensions of the claws extending into the coupling half from the other coupling half; and
   a molded part of elastic material positioned between successive claws from each of the coupling halves, said molded part having shaped pieces with convex sides between opposite concave flanks of successive claws and bridging parts alternately connecting opposite end faces of adjacent shaped parts, said shaped pieces, when not transmitting a load, having a radial dimension less than the radial dimension of the pockets, and said shaped pieces being free to expand radially inward and outward when transmitting a load; and said radial extending end portions of said pocket providing contact surfaces for said shaped pieces when said coupling halves are radially offset or angle with respect to each other.

2. A flexible coupling as in claim 1 including:

a detachable rim of claws on at least one of said coupling halves, said detachable rim being axially displaceable with respect to its coupling half.

3. A flexible coupling as in claim 2 wherein:

the cylindrical attachments of said coupling halves extend toward each other a distance not more than one-fifth of the axial length of said shaped pieces.

4. A flexible coupling as in claim 1 wherein:

each coupling half has a hub and an intermediate ring detachably connected at one end to the hub, the claws being on the other end of the intermediate ring.

5. A flexible coupling as in claim 4 wherein:

said intermediate rings are identical and interchangeable.

6. A flexible coupling as in claim 4 wherein:

at least one of said intermediate rings includes at least two interconnected discs.

7. A flexible coupling as in claim 6 wherein:

at least one of said discs is interconnected by claws and an annular ring of shaped parts in the spaces between flanks of the claws to form a plurality of flexible couplings.

8. A flexible coupling as in claim 1 wherein:

said molded part of elastic material is a highly elastic material resistant to oil and temperature.

9. A flexible coupling as in claim 8 wherein:

said material is natural or synthetic rubber of polyurethane.

10. A flexible coupling as in claim 1 wherein:

said pocket extends in a circumferential arc greater than the circumferential dimensions of the claw extending therein from the other coupling half.

11. A flexible coupling as in claim 1 wherein:

a major portion of each pocket is occupied by a claw from the other coupling half in the center of the pocket and a pair of shaped pieces between said claw and the flanks of the claws defining the pocket.

* * * * *